May 12, 1925.

A. W. LEES ET AL 1,537,536

RESILIENT TIRE

Filed July 28, 1923

Inventors!
Arthur W. Lees
John J. Sokol

Patented May 12, 1925.

1,537,536

UNITED STATES PATENT OFFICE.

ARTHUR W. LEES AND JOHN J. SOKOL, OF RACINE, WISCONSIN.

RESILIENT TIRE.

Application filed July 28, 1923. Serial No. 654,370.

*To all whom it may concern:*

Be it known that we, ARTHUR W. LEES and JOHN J. SOKOL, both citizens of the United States, and residents of Racine, in the county of Racine and State of Wisconsin, have invented certain new and useful Improvements in Resilient Tires; and we do hereby declare that the following is a full, clear, and exact description thereof.

This invention relates to resilient tires.

Objects of this invention are to provide a resilient tire in which the tire body is permitted universal movement relatively to the felly, in which the different portions of the tire are so constructed that they may have individual movement, and in which a resilient connection is secured between the tire and felly in a longitudinal direction, but which produces a rapidly increasing yielding force upon slight relative peripheral motion between the tire and the felly, thus admirably adapting the wheels for use as driving wheels as well as front wheels for an automobile.

An embodiment of the invention is shown in the accompanying drawing, in which:—

Figure 1 is a side elevation partly broken away showing the resilient tire.

Figure 2 is a sectional view on the line 2—2 of Figure 1.

Figure 3 is a top plan view of one of the elements located within the casing.

The tire comprises a hollow inner casing having a bottom 1 and side walls 2. This inner casing is adapted to be secured to the felly 3 of a wheel by means of bolts 4 or other suitable devices. This inner casing is preferably composed of sheet metal and is surrounded by an outer flexible casing concentric therewith and having a relatively thick body portion 5 and relatively thinner sides 6. A pair of rings 7 are positioned externally of the walls 2 of the inner casing and are grooved, as indicated at 8, to receive the beads 9 of the tire. These rings are held in position by means of bolts 10 extending completely through the inner casing and each provided with a spacer sleeve 11 preferably of rectangular cross section, as indicated. A plurality of blocks 12 are arranged in contacting relation and bear against the inner surface of the thickened body portion of the outer casing and approximately fit such inner portion. These blocks are provided with metal plates 13 upon their inner faces which hingedly carry a plurality of radially positioned inwardly extending plates 14, such plates being preferably provided with inwardly slanting side edges 15. The plates, as will be seen from Figure 1, are also provided with offset portions 16, which, together form an elongated rectangular recess for the reception of the rectangular sleeve of the bolts. Each of the plates is provided with an upstruck circular portion 17 around which helical springs 18 seat. These springs are so proportioned that they are normally under compression and thus tend to rock the plates 14 about their pivotal point. A plurality of pairs of radially arranged compression springs 19 are positioned between the bottom 1 of the inner casing and the blocks 12. A convenient way of retaining these springs in position is to form upstruck flanges 20 in the plates 13 around the holes which receive the attaching screws 21 of such plates. The bottom portion 1 of the inner casing is similarly provided with upstruck flanges 22 which center the inner end of the springs 19.

By this construction, it will be seen that uniform relative motion is permitted between the outer casing portion and the inner casing portion of the composite casing, and that the body of the tire may, therefore, move in any direction with reference to the felly of the wheel. For instance, if an obstruction is encountered on one side of the tire it may rock the corresponding blocks 12 and compress one of the springs 19 of a pair more than the other, thus rocking the blocks and the radial plates 14—the beveled edges 15 of such plates prevent contacting with the walls 2 of the inner casing.

Further, it will be seen that the blocks are permitted individual motion so that the small irregularities in the roadway may be readily accommodated with the same ease as is secured by a pneumatic tire without subjecting the entire wheel to displacement. It will further be seen that a yielding driving connection is secured by means of the plates 14 and the springs 18 between the outer portion of the tire and the felly of the wheel.

It will be, therefore, seen that a resilient tire has been provided in which the same facilities of accommodation are afforded as are present in a pneumatic tire.

Although one form of the invention has been described in considerable detail, it is to be understood that the invention may be variously embodied and is, therefore, to be limited only as claimed.

We claim:

1. A resilient tire comprising an inner casing adapted to be secured to the felly of a wheel, an outer flexible casing surrounding said inner casing and concentric therewith, means for securing said outer casing to said inner casing, a plurality of blocks located within said outer casing, a plurality of pairs of radially arranged springs located between said blocks and said inner casing, a plurality of radially positioned, inwardly extending plates hinged to said blocks, and a plurality of springs located between said plates.

2. A resilient tire comprising a hollow inner casing having side walls, and adapted to be secured to the felly of a wheel, an outer flexible casing surrounding said inner casing and concentric therewith, means for securing said outer casing to said inner casing, a plurality of blocks, a plurality of pairs of radially arranged springs located between said blocks and said inner casing, a plurality of radially positioned, inwardly extending plates hinged to said blocks, a plurality of bars secured to the side walls of the inner casing and contacting with said plates, and a plurality of springs located between said plates.

3. A resilient tire comprising an inner casing adapted to be secured to the felly of a wheel and having side walls, an outer flexible casing surrounding said inner casing and concentric therewith, a plurality of blocks located within said outer casing, a plurality of pairs of radially arranged springs located between said blocks and said inner casing, a plurality of plates hinged to said blocks and extending radially inwardly and having offset portions, a pair of annular rings positioned externally of said inner casing and binding the inner edges of said outer casing against the side walls of said inner casing, and a plurality of members extending transversely through said inner casing and holding said rings in position, said members contacting with the offset portions of said plates.

In testimony that we claim the foregoing we have hereunto set our hands at Racine, in the county of Racine and State of Wisconsin.

ARTHUR W. LEES.
JOHN J. SOKOL.